United States Patent
Wu

(10) Patent No.: US 11,915,025 B2
(45) Date of Patent: Feb. 27, 2024

(54) SYSTEM AND METHOD TO SUPPORT PORT MAPPING FOR VIRTUAL MACHINE BASED CONTAINER

(71) Applicant: VMware, Inc., Palo Alto, CA (US)

(72) Inventor: Junfei Wu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 561 days.

(21) Appl. No.: 16/985,859

(22) Filed: Aug. 5, 2020

(65) Prior Publication Data
US 2022/0012081 A1 Jan. 13, 2022

(30) Foreign Application Priority Data
Jul. 10, 2020 (WO) ................ PCT/CN2020/101300

(51) Int. Cl.
*G06F 9/455* (2018.01)
(52) U.S. Cl.
CPC .......... *G06F 9/45558* (2013.01); *G06F 2009/45562* (2013.01); *G06F 2009/45575* (2013.01)
(58) Field of Classification Search
None
See application file for complete search history.

(56) References Cited

U.S. PATENT DOCUMENTS

| 9,430,295 | B1* | 8/2016 | Eizadi | H04L 63/00 |
| 9,952,885 | B2* | 4/2018 | Chanda | H04L 61/5014 |
| 10,841,226 | B2* | 11/2020 | Mariappan | H04L 47/125 |
| 2016/0335129 | A1* | 11/2016 | Behera | H04L 45/586 |
| 2017/0180250 | A1* | 6/2017 | Shen | H04L 45/586 |

* cited by examiner

*Primary Examiner* — Lewis A Bullock, Jr.
*Assistant Examiner* — Melissa A Headly
(74) *Attorney, Agent, or Firm* — King Intellectual Asset Management

(57) ABSTRACT

When containers run in a guest operating system of a virtual machine running on the host computer system, the containers communicate with each other via ports of each container and a network. The ports of each container stay constant, but the virtual machine in which they run may change its IP address on the network when it is power-cycled. To avoid losing connection to the ports of the containers, a record table that associates static identifiers, such as MAC addresses, of the virtual machine with the container ports is maintained. The static identifiers of the virtual machines do not change and provide a way of identifying the virtual machine on which the virtual container was running before it was powered off. When the virtual machine is powered on, the linkage between the container port and the network can be re-established using the record table.

20 Claims, 11 Drawing Sheets

SYSTEM AND METHOD TO SUPPORT PORT MAPPING FOR VIRTUAL MACHINE BASED CONTAINER

CROSS-REFERENCE TO RELATED APPLICATION(S)

This application claims benefit of and priority to International Application No. PCT/CN2020/101300, filed Jul. 10, 2020, which is hereby assigned to the assignee hereof and hereby expressly incorporated by reference herein in its entirety as if fully set forth below and for all applicable purposes.

BACKGROUND

Containers are virtualizations of an operating system in which a portion of the resources over which the operating system has control, such as namespaces, control groups, and files systems, is used to form an isolated environment in which an image of an application program runs.

Containers can be interconnected over a network. For a container to communicate over a network, an isolated network stack and an interface are needed. The isolated network stack includes Ethernet interfaces, socket ports, routing tables, and a DNS configuration. The interface is a virtual network interface (i.e., a network adapter) that is responsible for making a connection to a network.

The simplest network for containers is a single-host bridge network. This network only allows the connection of multiple containers on the same host computer system. To alleviate this restriction, a port-mapping facility allows a mapping of a container port, usually a fixed address, to a host port, usually a fixed port. Traffic that is directed to the host port is redirected via the mapping to the container port.

In some designs, a host computer system can support multiple virtual machines, and a container can run in a virtual machine while the container runtime runs natively on the host computer system. In this case, the container port is mapped to a port of the virtual machine which resides on a virtual network in the host computer system and has an IP address. If the virtual machine is powered off and then back on, the virtual machine may change its IP address, which severs the link to the container port.

It is desirable to re-establish a link to the container port after a virtual machine running a container is restored to power.

SUMMARY

An embodiment is a method for running a container in a virtual machine. The method includes powering on the virtual machine, the virtual machine having a static identifier, obtaining an IP address for the virtual machine, determining that the virtual machine is assigned to a communication port of the container. Determining that the virtual machine is assigned to a communication port of the container includes searching a table that includes entries each of which contains a mapping from a communication port of a container to a static identifier of a virtual machine, and finding an entry for the static identifier of the powered-on virtual machine. The method further includes associating the IP address of the virtual machine with the communication port of the container and starting the container running in the virtual machine.

Further embodiments include a computer-readable medium containing instructions for carrying out one more aspects of the above method, and a system configured to carry out one or more aspects of the above method.

DETAILED DESCRIPTION

Embodiments described herein provide for managing access to a communication port of a container that runs in a virtual machine while the container runtime runs natively on the host computer system whose virtualization software runs the virtual machine. The virtual machine is connected to a virtual network on the host computer system and thus has a fixed medium access control (MAC) address and an Internet Protocol (IP) address. The virtual machine can be powered off and back on, causing its IP address to be reassigned. A reassigned IP address for the virtual machine means that communications traffic to the communications port of the container fails. Embodiments provide for recording a mapping of the MAC address of the virtual machine to the communication port of the container. The record of this mapping allows the system to determine the virtual machine which previously ran the container when it is powered up so that the reassigned IP address can be used to direct communications traffic to the communication port of the container. It should be noted, that though certain aspects are described herein with respect to recording a mapping of the MAC address of the virtual machine to the communication port of the container, the mapping can be of any static identifier (e.g., MAC address, VM UUID, etc.) of the virtual machine to the communication port of the container.

Figure 1:
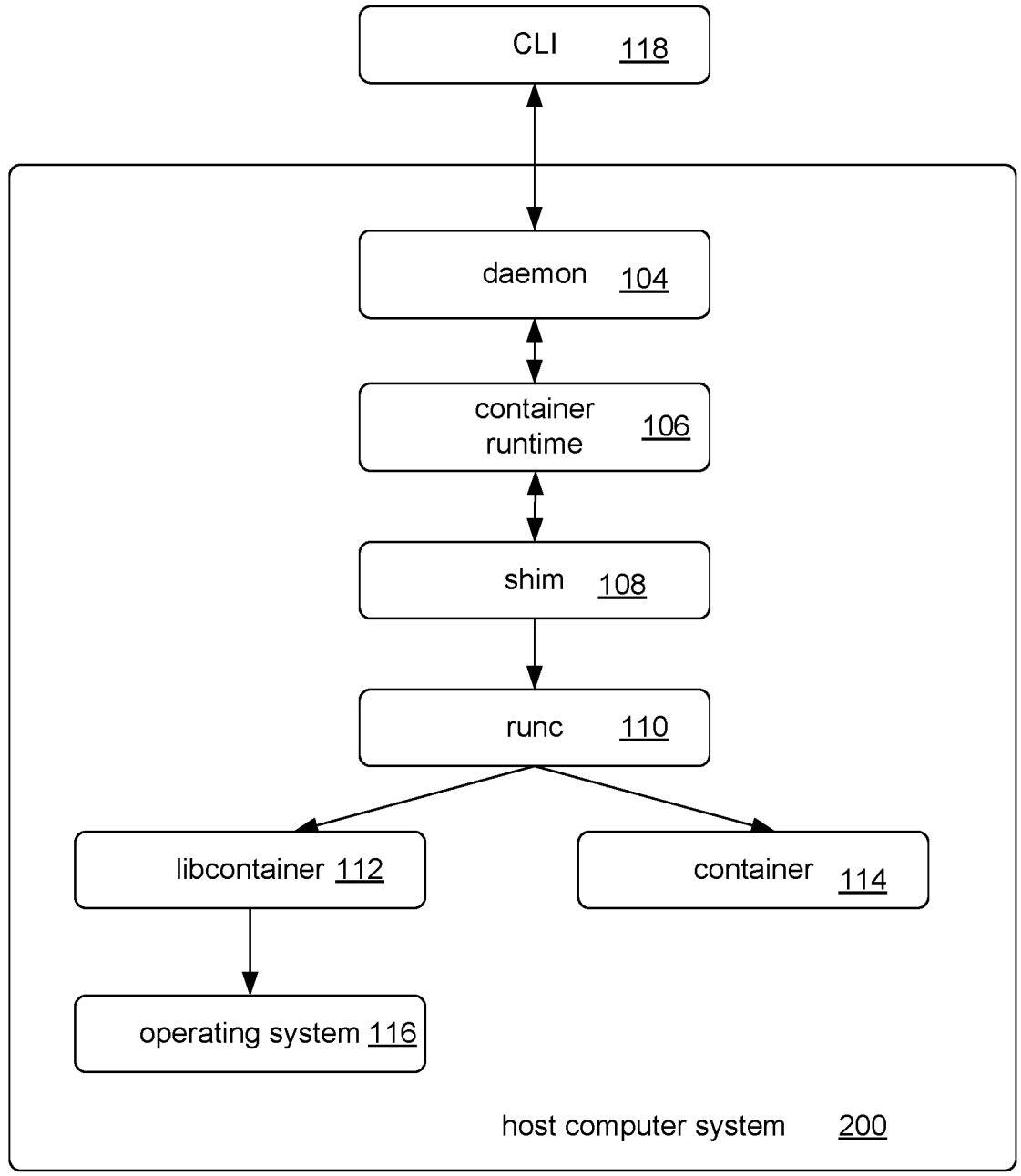
FIG. 1 depicts a reference architecture for running a container on a host computer system.

FIG. 1 depicts a reference architecture for running a container on a host computer system. In the figure, the host computer system 200 includes an operating system 116 that is coupled to a system library called libcontainer 112. A program, runc 110, is coupled to libcontainer 112 and to the container 114 itself. Coupled between runc 110 and a container runtime 106 is a shim 108. The container runtime 106 program is coupled to a daemon 104 that receives commands from a command-line interface 118 (CLI).

The program, runc 110, is a wrapper around libcontainer 112 and is the program that creates containers. The libcontainer 112 marshals all of the needed namespaces from the operating system 116 to create a container 114.

Container runtime 106 is a process that manages the life cycle operations of a container, such as start, pause, stop and remove. For example, container runtime 106 can be containerd, which is a container runtime developed by Docker, Inc.

The shim program 108 is present to become the parent process of a newly created container 114 after runc 110 completes the creation of the container 114.

The daemon 104 is a process that includes an application programming interface (API) for receiving a request from the CLI 118 and for performing image management, image builds, authentication, security, networking, and orchestration. Common CLI requests include those in Table 1.

TABLE 1

| | |
|---|---|
| create | create a new container |
| commit | create a new image from a container's changes |
| image | manage images |
| pause | pause all processes within one or more containers |
| pull | pull an image or repository from a registry |
| push | push an image or repository to a registry |
| restart | restart one or more containers |
| rm | remove one or more containers |
| run | run a command in a new container |
| start | start one or more stopped containers |

Figure 2:
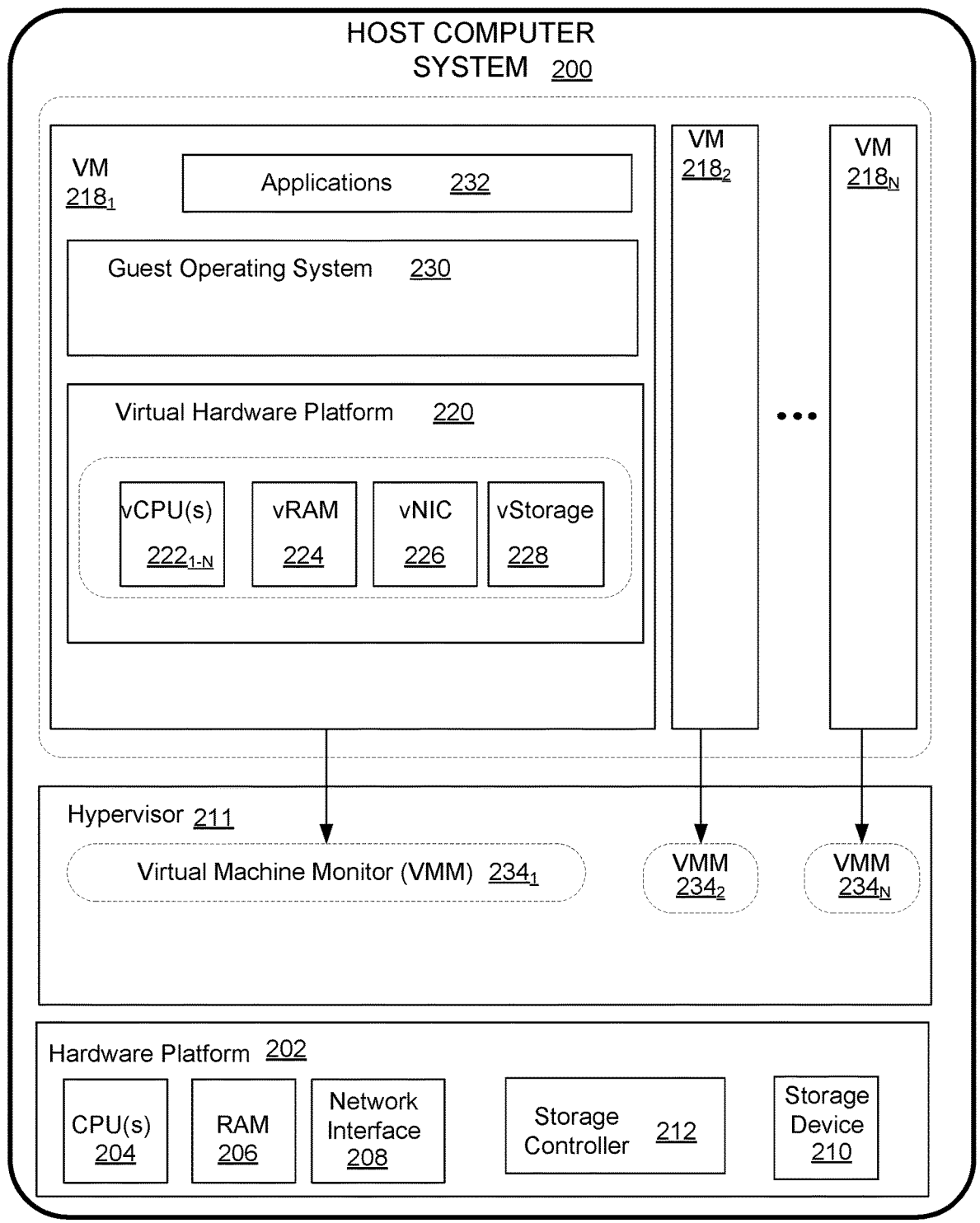
FIG. 2 depicts a block diagram of a host computer system that is representative of a virtualized computer architecture.

FIG. 2 depicts a block diagram of a host computer system 200 that is representative of a virtualized computer architecture. As is illustrated, host computer system 200 supports multiple virtual machines (VMs) $218_1$-$218_N$, which are an example of virtual computing instances that run on and share a common hardware platform 202. Hardware platform 202 includes conventional computer hardware components, such as random access memory (RAM) 206, one or more network interfaces 208, storage controller 212, persistent storage device 210, and one or more central processing units (CPUs) 204. Central processing units 204 may include processing units having multiple cores.

A virtualization software layer, hereinafter referred to as a hypervisor 211, is installed on top of hardware platform 202. Hypervisor 211 makes possible the concurrent instantiation and execution of one or more VMs $218_1$-$218_N$. The interaction of a VM 218 with hypervisor 211 is facilitated by the virtual machine monitors (VMMs) $234_1$-$234_N$. Each VMM $234_1$-$234_N$ is assigned to and monitors a corresponding VM $218_1$-$218_N$. In one embodiment, hypervisor 211 may be a VMkernel™ which is implemented as a commercial product in VMware's vSphere® virtualization product, available from VMware™ Inc. of Palo Alto, Calif. In an alternative embodiment, hypervisor 211 runs on top of a host operating system, which itself runs on hardware platform 202. In such an embodiment, hypervisor 211 operates above an abstraction level provided by the host operating system.

After instantiation, each VM $218_1$-$218_N$ encapsulates a virtual hardware platform 220 that is executed under the control of hypervisor 211. Virtual hardware platform 220 of VM $218_1$, for example, includes but is not limited to such virtual devices as one or more virtual CPUs (vCPUs) $222_1$-$222_N$, a virtual random access memory (vRAM) 224, a virtual network interface adapter (vNIC) 226, and virtual storage (vStorage) 228. Virtual hardware platform 220 supports the installation of a guest operating system (guest OS) 230, which is capable of executing applications 232.

Examples of guest OS 230 include any of the well-known operating systems, such as the Microsoft Windows™ operating system, the Linux™ operating system, and the like.

Figure 3:
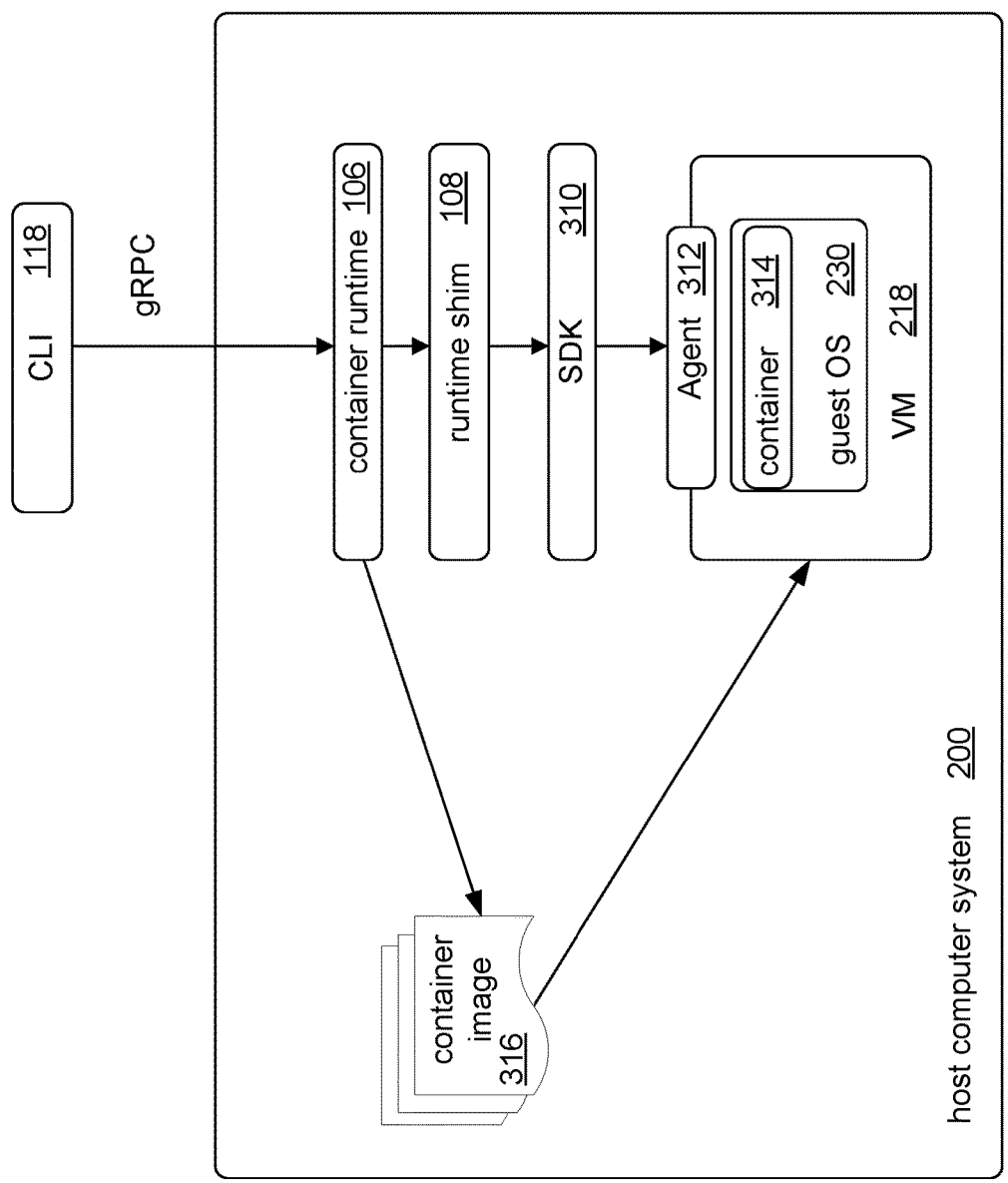
FIG. 3 depicts a configuration for running a container in a virtual machine that runs on a host computer system, in an embodiment.

FIG. 3 depicts a configuration for running a container in a virtual machine that runs on a host computer system, in an embodiment. In the configuration depicted, a virtual machine 218 runs a guest operating system 230, such as the Linux® operating system, on host computer system 200 and guest operating system 230 runs a container 314, as a process. The virtual machine 218 has an interface agent 312 that is coupled to a software development kit (SDK) 310, which in turn, is coupled to a container runtime shim 108. A container runtime 106 (e.g., containerd) is coupled between the shim 108 and a command-line interface (CLI) 118 via a remote procedure call (RPC).

In some embodiments, the virtual machine 218 is a light-weight VM that is customized to run containers.

The SDK 310 is a wrapper for the VM and provides language support for interacting with VM 218.

The shim 108 is a process that becomes a parent process for a container when the container is created.

Container runtime 106 runs natively on host computer system 200 and is the process that manages the life cycle of the container. In particular, container runtime fetches a container image 316 when requested by CLI 118.

The RPC, such as gRPC, performs two-way authentication of CLI 118 and the container runtime 106 and encodes data transferred between the container runtime 106 and CLI 118.

Figure 4A:
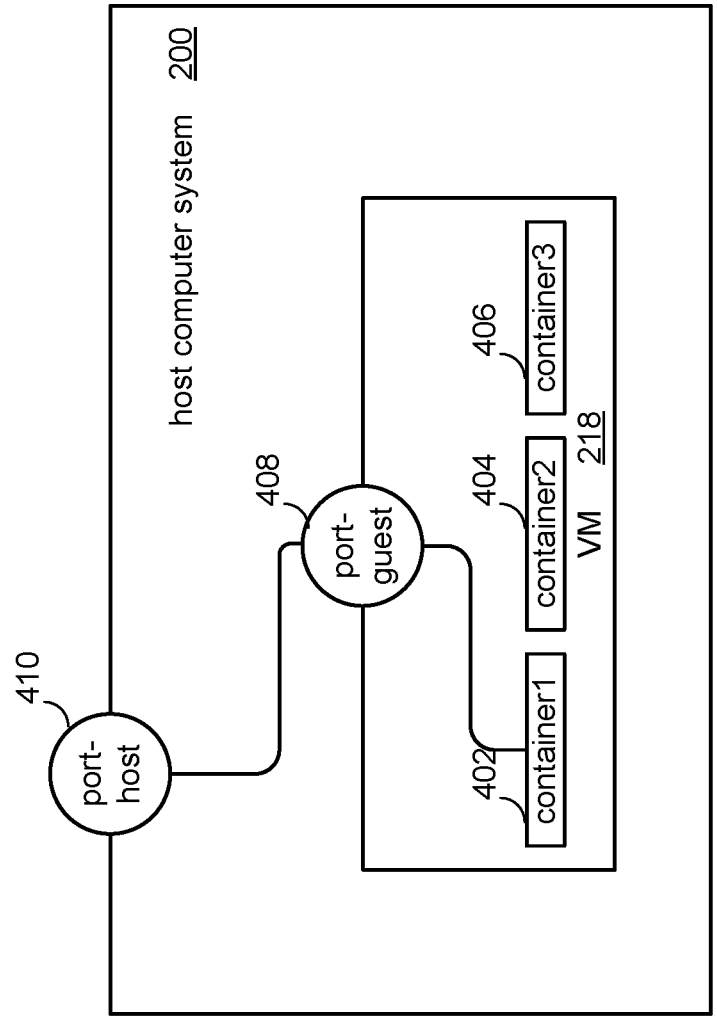
FIG. 4A depicts port connections in a host computer system with a virtual machine in which a container runs.

FIG. 4A depicts port connections in a host computer system with a virtual machine in which a container runs. In the figure, the host computer system 200 includes a virtual machine 218 in which container1 402, container2 404, and container3 406 run. Container1 402 is coupled to a port, port-guest 408. The port-guest 408 is mapped to the port, port-host 410. This port mapping couples communication traffic at the port-host to container1 402 via the port-guest 408.

Figure 4B:
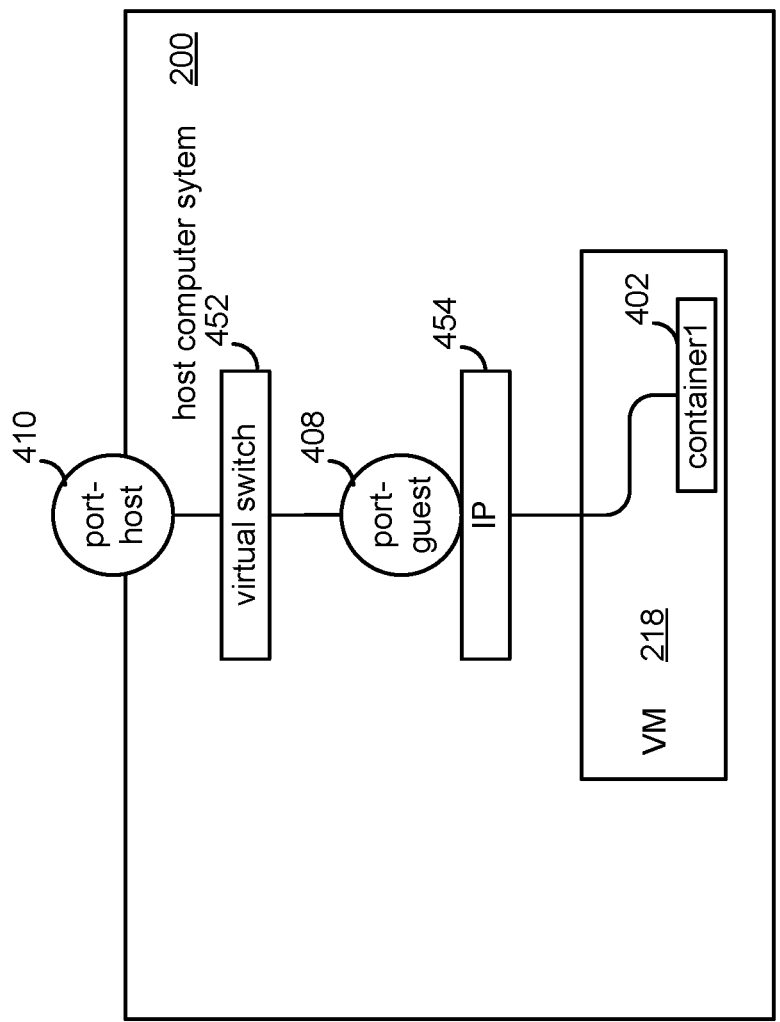
FIG. 4B depicts port connection in a host computer system with a virtual machine and a network connected to the virtual machine, in an embodiment.

FIG. 4B depicts port connection in a host computer system with a virtual machine and a network connected to the virtual machine, in an embodiment. In the figure, the virtual machine 218, in which container1 402 runs, is coupled to a port-host 410 via a port-guest 408 and a virtual switch 452 with port-forwarding, connected to a virtual network on the host computer system 200. Port-forwarding is specified by mapping of a port-host to a VM IP 454. For example, if the port-host 8080 410 is mapped to current IP_address:port_number 192.168.1.110:8080 of the virtual machine 218, the user can access container port 80 from the port 8080 [socket?] of the host computer system 200. If container1 402 and virtual machine 218 are stopped, and the virtual machine 218 is restarted, the IP address of the virtual machine 218 can change, such as from 192.168.1.110 to 192.168.1.111, because a dynamic host communications protocol (DHCP) service on the host computer system may assign a different IP address to the virtual machine 218. Port 80 of the container1, having been mapped to the original IP_address:port_number, 192.168.1.110:8080, is now unreachable because the port mapping is incorrect.

Figure 5:
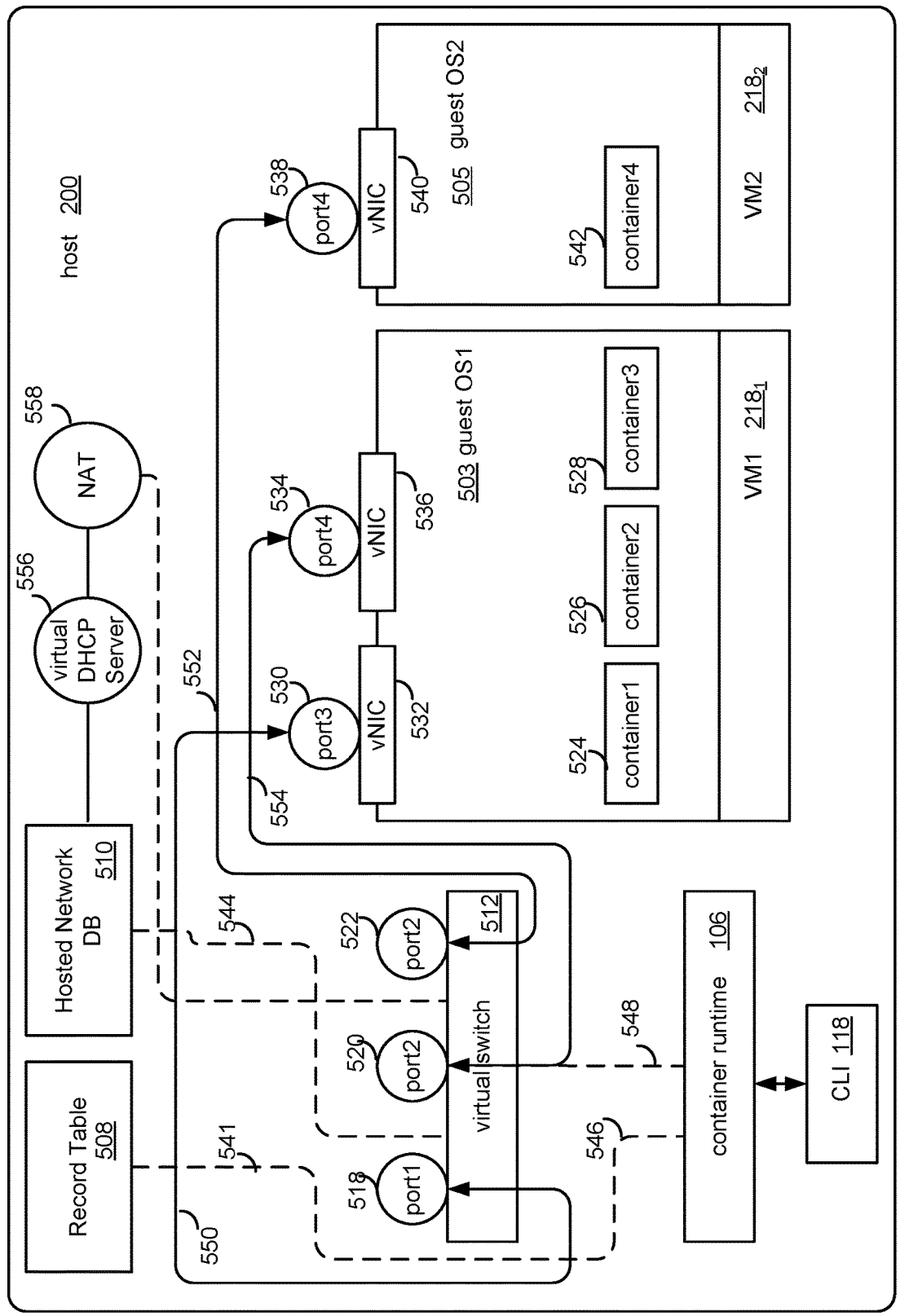
FIG. 5 is an arrangement in which several containers run in a guest operating system, which runs on a host computer system with a virtual network, in an embodiment.

FIG. 5 is an arrangement in which several containers run in a guest operating system, which runs on a host computer system with a virtual network, in an embodiment. The host computer system 200 includes a first VM $218_1$, a second VM $281_2$, a record table 508, a hosted network database 510, a virtual switch 512, a container runtime 106, and a command-line interface (CLI) 118.

The first VM 218₁ includes a guest operating system (guest OS1) 503 that runs container1 524, container2 526, and container3 528, a first virtual network interface (also known as a virtual network adapter) vNIC 532 coupled to port3 530 and a second vNIC 536 coupled to port4 534 of guest OS1 503. The vNICs 532, 536 are created when the virtual machine 218₁ is created and can be added after the virtual machine 218₁ is running.

The second VM (VM2) 218₂ includes a guest operating system guest OS2 505, a container4 542, and a vNIC 540 coupled to port4 538. The vNIC 540 is created when the virtual machine VM2 218₂ is created and can be added after the virtual machine 218₂ is running.

The virtual switch 512 is coupled to port1 518, a first port2 520, and a second port2 522. A network address translation (NAT) device 558 is also included in the host computer system 200. The NAT device 558 passes network data between one or more virtual machines and an external network, identifies incoming data packets intended for each virtual machine, and sends them to the correct destination. In a configuration with a NAT, a virtual machine does not have its own IP address on the network. Instead, the virtual machine gets an address on the network from a virtual dynamic host configuration protocol (DHCP) server 556.

The record table 508 is coupled via path 541 to the container runtime 106 and contains information for recording mappings from MAC addresses to container ports.

The hosted network database 510 is coupled to the virtual switch 512 to provide control data, such as port forwarding data, for the virtual switch 512.

The container runtime 106 runs natively on the host computer system 200. The container runtime 106 receives commands from the CLI 118 and provides mapping information to the record table 508.

The CLI 118 interfaces with a user to receive commands for starting, stopping, and running container1, container2, container3, and container4.

In the figure, the first port2 520 is mapped to port4 534 of guest OS1 503, and the second port2 522 is mapped to port4 of guest OS2 538.

In this arrangement, container1 524 can communicate with container2 526 and container3 528 of guest OS1 503 as well as container4 542 of guest OS2 505 via the forwarding of the virtual switch 512.

FIGS. 6-9 describe a set of functions for handling a changing IP address of a virtual machine running a container.

Figure 6:
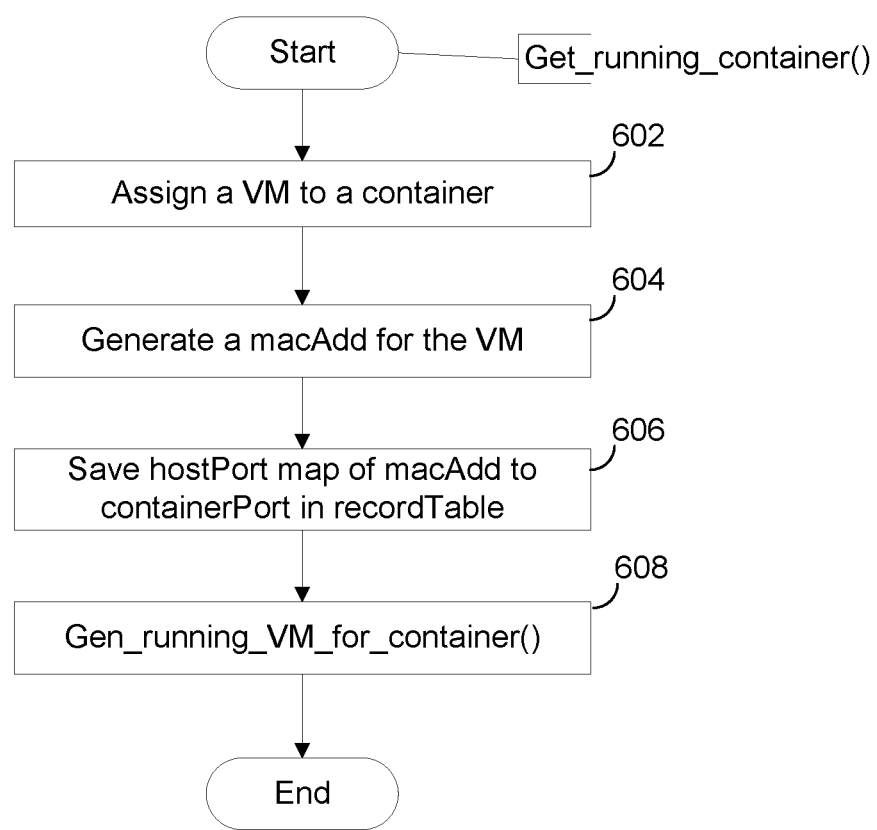
FIG. 6 depicts a flow of operations for a function get running container, in an embodiment.

FIG. 6 depicts a flow of operations for a function get_running_container, in an embodiment. This function performs steps that first selects a VM in which a container is to run and then records in the record table 508 a MAC address for the selected virtual machine, after which it calls a function to complete the operation of getting the container to a running state in a running VM. The MAC address will serve to identify the VM in which the container runs regardless of what IP address is assigned to the VM.

Referring to the figure, in step 602, the function assigns a virtual machine (VM) to a container. In step 604, the function generates a MAC address for the virtual machine. In step 606, the function saves to the record table 508 a record mapping the generated MAC address to the container port. Because the MAC address of a VM does not change and the container port does not change, this mapping will be correct for the life of the container. In step 608, the function calls a gen_running_VM_for_container function.

Figure 7:
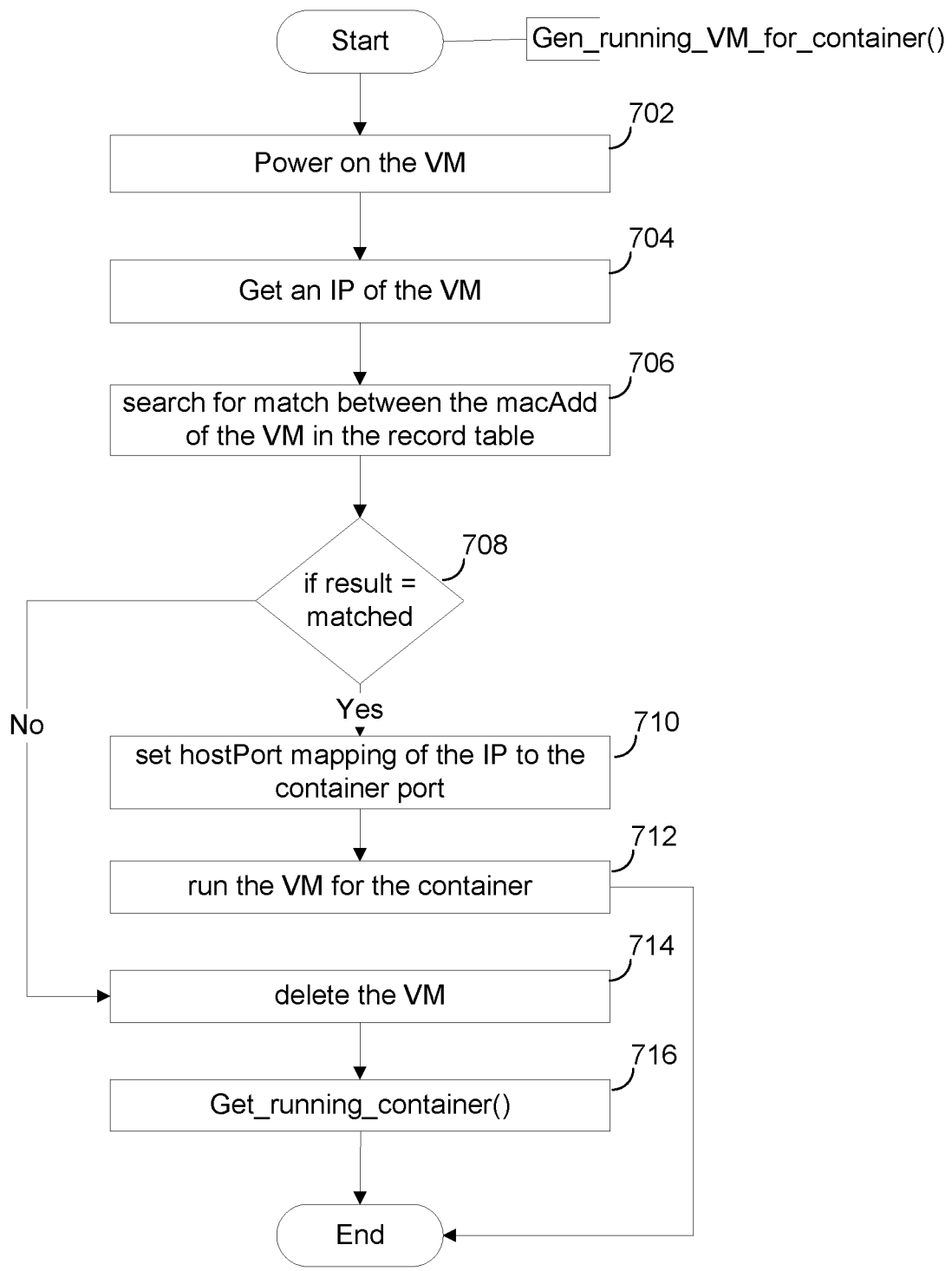
FIG. 7 depicts a flow of operations for the gen running VM for container function, in an embodiment.

FIG. 7 depicts a flow of operations for the gen_running_VM_for_container function, in an embodiment. This function starts the selected VM and links the IP address of the running VM and then starts the container. If the function fails, the function calls get_running_container as depicted in FIG. 6 to try again.

Referring to the figure, in step 702, the function powers on a virtual machine (VM). In step 704, the function gets the IP address of the VM and the MAC address of the VM. In step 706, the function searches for a match of the MAC address associated with the container port in the record table 508. In step 708, the function tests the results of the search for a match. If a match is found, then in step 710, the function adds into the hosted network database 510 a mapping from the IP address of the VM to the container port. In step 712, the function starts the VM for the container. If, as determined in step 708, there is no match, then in step 714, the function deletes the virtual machine, and in step 716, the function calls get_running_container again, which makes another attempt.

Figure 8:
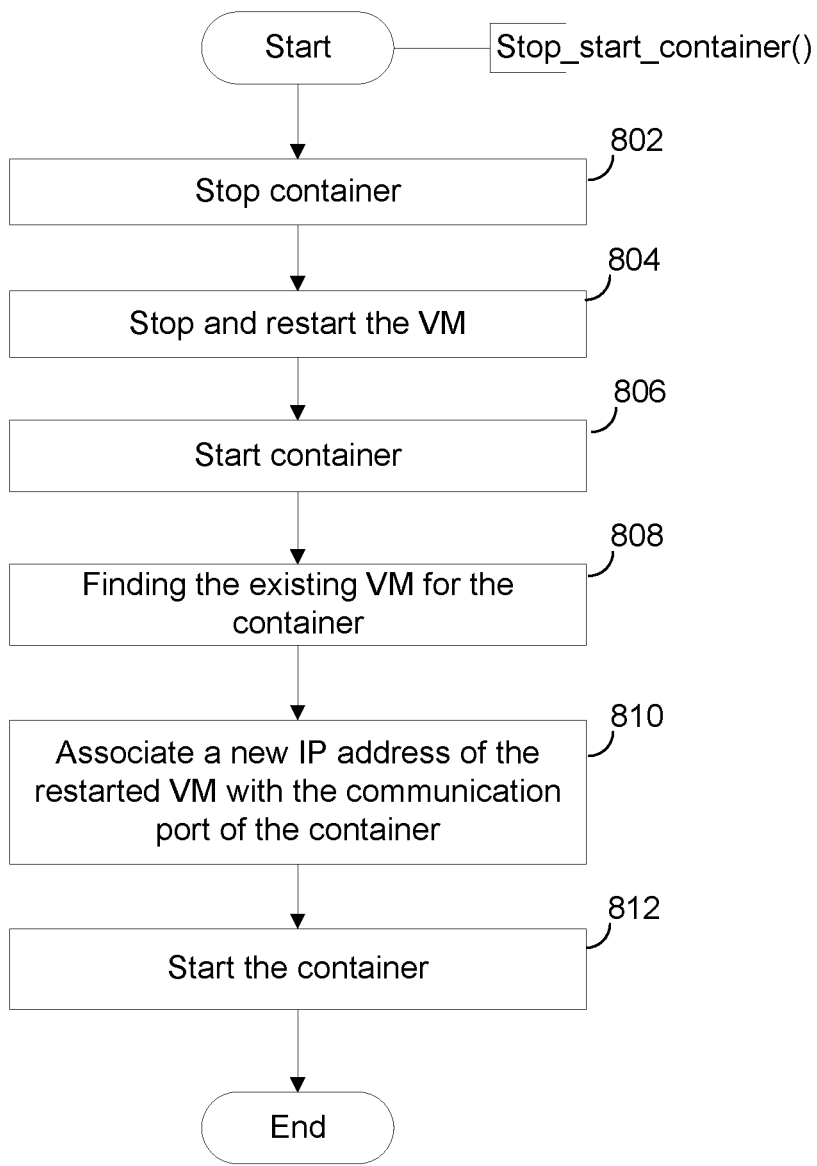
FIG. 8 depicts a flow of operations for the function stop start container, in an embodiment.

FIG. 8 depicts a flow of operations for the function stop start container, in an embodiment. This function temporarily stops (i.e., pauses) a container and a VM and then restarts them. The function uses the record table 508 to re-establish the connection between the container port and the IP address of the restarted VM.

Referring to the figure, in step 802, the function stops a running container by receiving a command from the container runtime 106 via the command-line interface (CLI) 118. In step 804, the function stops and restarts the VM in which the container runs. In step 806, the function restarts the container via a command from the command line interface 118. In step 808, the function finds in the record table 508 the VM that previously ran the container. In step 810, the function associates a new IP address of the restarted VM with the communication port of the container. In step 812, the function starts the container via a command received from CLI 118.

Figure 9:
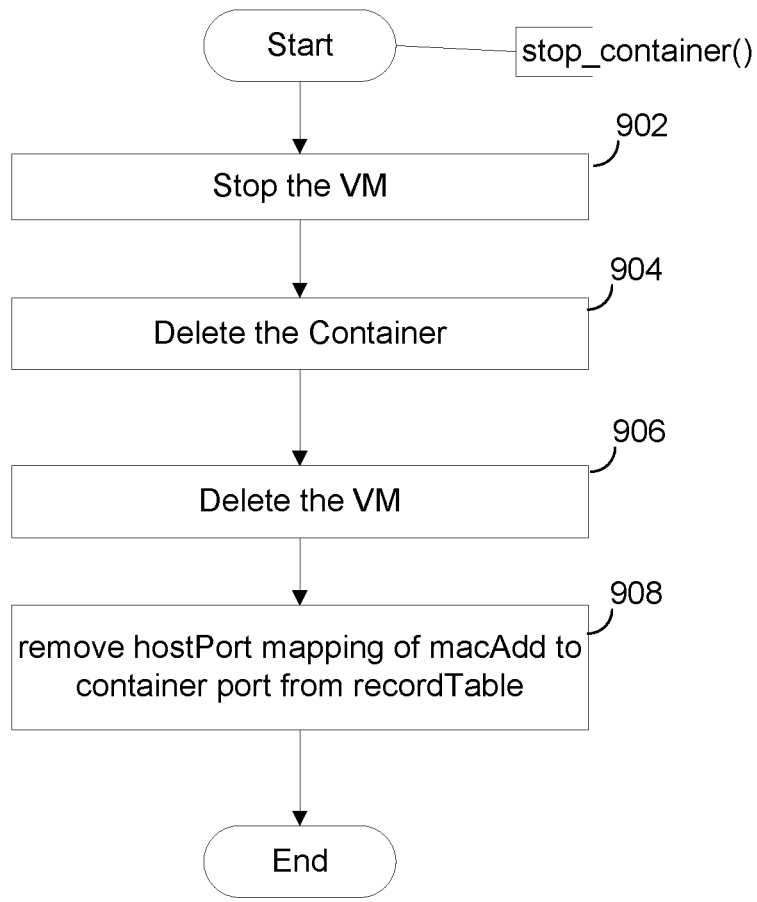
FIG. 9 depicts a flow of operations for stopping a container, in an embodiment.

FIG. 9 depicts a flow of operations for stopping a container, in an embodiment. This function permanently stops a container and a virtual machine, tears down the virtual machine, and removes the record in the record table 508 of the mapping of the MAC address of the VM to the container port.

Referring to the figure, in step 902, the function stops the virtual machine. In step 904, the function deletes the container. In step 906, the function deletes the virtual machine. In step 908, the function removes the mapping of the MAC address of the VM to the container port from the record table 508.

Figure 10:
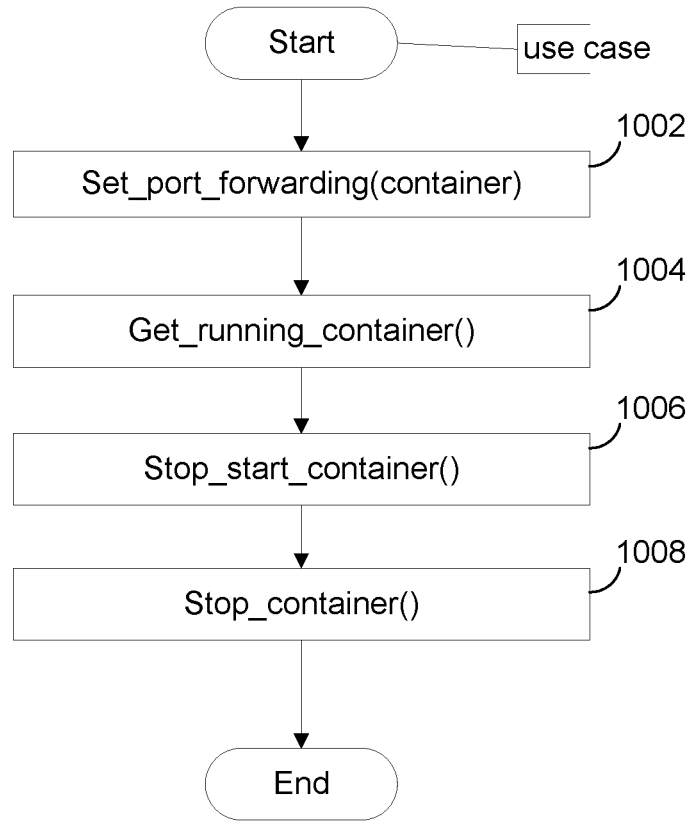
FIG. 10 depicts a flow of operations for a use case, in an embodiment.

FIG. 10 depicts a flow of operations for a use case, in an embodiment. In the use case, the flow in step 1002 calls set_port_forwarding to enable the port forwarding function in a virtual switch. In step 1004, the flow calls get_running_container, which establishes a running VM with a running container according to the flow of operations depicted in FIG. 6. In step 1006, the flow calls stop_start_container according to the flow of operations depicted in FIG. 8. In step 1008, the function calls stop_container according to the flow of operations depicted in FIG. 9.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for running a container in a virtual machine, the method comprising:
after the virtual machine was previously linked to a communication port of the container based on a previous internet protocol (IP) address of the virtual machine and after the virtual machine was previously powered off:
powering on the virtual machine, the virtual machine having a static identifier;
obtaining an IP address for the virtual machine;
determining that the virtual machine was previously linked to the communication port of the container by:
searching a table that includes entries each of which contains a mapping from a respective communication port of a respective container to a respective static identifier of a respective virtual machine, and
finding an entry in the table for the static identifier of the virtual machine;
establishing a link between the IP address of the virtual machine and the communication port of the container based on the finding of the entry in the table for the static identifier of the virtual machine, wherein the IP address of the virtual machine and the previous IP address of the virtual machine are not included in the entry in the table; and starting the container running in the virtual machine after the establishing of the link.

2. The method of claim 1, wherein the static identifier of the virtual machine is a medium access control (MAC) address; and wherein the MAC address of the virtual machine was stored in the table when the virtual machine was assigned to the container.

3. The method of claim 1, wherein the virtual machine runs on a host computer system that includes a dynamic host communication protocol (DHCP) service; and wherein the IP address for the virtual machine is obtained from the DHCP service.

4. The method of claim 3, wherein the host computer system includes a port-forwarding service and a virtual switch; and wherein the port-forwarding service forwards packets incoming to the host computer system to the communication port of the container via the virtual switch.

5. The method of claim 3, wherein the host computer system includes a container runtime and a command -line interface;

wherein starting the container includes receiving a command via the command-line interface to the container runtime to start the container.

6. The method of claim 1, further comprising pausing the container by:

stopping the container;

stopping and restarting the virtual machine in which the container runs, the restarted virtual machine having a new IP address;

starting the container; finding the entry in the table for the static identifier of the virtual machine;

associating the new IP address of the virtual machine with the communication port of the container; and starting the container running in the virtual machine.

7. The method of claim 1, further comprising permanently stopping the container by:

stopping the virtual machine in which the container runs;

deleting the container;

deleting the virtual machine; and removing the mapping of the communication port of the container to the static identifier of the virtual machine from the table.

8. The method claim 7, wherein the virtual machine runs on a host computer system that includes a container runtime and a command-line interface; and wherein removing the mapping includes receiving a command to the container runtime via the command-line interface to remove the mapping.

9. A host computer system comprising:

one or more CPUs; and a memory coupled to the one or more CPUs, the memory having loaded therein:

virtualization software for running one or more virtual machines, wherein at least a virtual machine of the virtual machines has running thereon a guest operating system, and wherein a container is to be run by the guest operating system;

wherein the virtualization software is configured to:

after the virtual machine was previously linked to a communication port of the container based on a previous internet protocol (IP) address of the virtual machine and after the virtual machine was previously powered off:

power on the virtual machine, the virtual machine having a static identifier;

obtain an IP address for the virtual machine;

determine that the virtual machine was previously assigned linked to the communication port of the container by:

searching a table that includes entries each of which contains a mapping from a respective communication port of a respective container to a respective static identifier of a respective virtual machine, and finding an entry in the table for the static identifier of the virtual machine;

establish a link between the IP address of the virtual machine and the communication port of the container based on the finding of the entry in the table for the static identifier of the virtual machine, wherein the IP address of the virtual machine and the previous IP address of the virtual machine are not included in the entry in the table; and start the container running in the virtual machine after the establishing of the link.

10. The host computer system of claim 9, wherein the static identifier of the virtual machine is a medium access control (MAC) address; and wherein the MAC address of the virtual machine was stored in the table when the virtual machine was assigned to the container.

11. The host computer system of claim 9, wherein the memory has further loaded therein a dynamic host address protocol (DHCP) service;

wherein the IP address for the virtual machine is obtained from the DHCP service;

wherein the memory has further loaded therein a port-forwarding service and a virtual switch; and wherein the port-forwarding service forwards packets incoming to the host computer system to the communication port of the container via the virtual switch.

12. The host computer system of claim 9, wherein the memory has further loaded therein a container runtime and a command-line interface; and wherein starting the container includes receiving a command via the command-line interface to the container runtime to start the container.

13. The host computer system of claim 9, wherein the virtualization software is further configured to pause the container by:

stopping the container;

stopping and restarting the virtual machine in which the container runs, the restarted virtual machine having a new IP address;

starting the container; finding the entry in the table for the static identifier of the virtual machine;

associating the new IP address of the virtual machine with the communication port of the container; and starting the container running in the virtual machine.

14. The host computer system of claim 9, wherein the virtualization software is further configured to permanently stop the container by:

stopping the virtual machine in which the container runs;

deleting the container;

deleting the virtual machine; and removing the mapping of the communication port of the container port to the static identifier of the virtual machine from the table.

15. A non-transitory computer-readable medium comprising instructions executable in a computer system, wherein the instructions when executed in the computer system cause the computer system to carry out a method for running a container in a virtual machine, the method comprising:

after the virtual machine was previously linked to a communication port of the container based on a previous internet protocol (IP) address of the virtual machine and after the virtual machine was previously powered off:

powering on the virtual machine, the virtual machine having a static identifier;

obtaining an IP address for the virtual machine; determining that the virtual machine was previously linked to the communication port of the container by:

searching a table that includes entries each of which contains a mapping from a respective communication port of a respective container to a respective static identifier of a respective virtual machine, and finding an entry in the table for the static identifier of the virtual machine;

establishing a link between the IP address of the virtual machine and the communication port of the container based on the finding of the entry in the table for the static identifier of the virtual machine, wherein the IP address of the virtual machine and the previous IP address of the virtual machine are not included in the entry in the table; and starting the container running in the virtual machine after the establishing of the link.

16. The non-transitory computer-readable medium of claim 15, wherein the static identifier of the virtual machine is a medium access control (MAC) address; and wherein the MAC address of the virtual machine was stored in the table when the virtual machine was assigned to the container.

17. The non-transitory computer-readable medium claim 15, wherein the virtual machine runs on a host computer system that includes a dynamic host communication protocol (DHCP) service;

wherein the IP address for the virtual machine is obtained from the DHCP service;

wherein the host computer system includes port-forwarding service and a virtual switch; and wherein the port-forwarding service forwards packets incoming to the host computer system to the communication port of the container via the virtual switch.

18. The non-transitory computer-readable medium of claim 17, wherein the host computer system includes a container runtime and a command-line interface;

wherein starting the container includes receiving a command via the command-line interface to the container runtime to start the container.

19. The non-transitory computer-readable medium of claim 15, wherein the method further comprises pausing the container by:

stopping the container;

stopping and restarting the virtual machine in which the container runs, the restarted virtual machine having a new IP address;

starting the container; finding the entry in the table for the static identifier of the virtual machine;

associating the new IP address of the virtual machine with the communication port of the container; and starting the container running in the virtual machine.

20. The non-transitory computer-readable medium of claim 15, wherein the method further comprises permanently stopping the container by:

stopping the virtual machine in which the container runs;

deleting the container;

deleting the virtual machine; and removing the mapping of the communication port of the container port to the static identifier of the virtual machine from the table.

* * * * *